United States Patent
Huang et al.

(10) Patent No.: US 7,085,413 B2
(45) Date of Patent: Aug. 1, 2006

(54) IMAGE BACKGROUND DETECTION AND REMOVAL

(75) Inventors: Hanqiang Huang, Irvine, CA (US); Yung-Kai Lai, Irvine, CA (US)

(73) Assignee: Good News Enterprises Limited, Taichung (TW)

( * ) Notice: Subject to any disclaimer, the term of this patent is extended or adjusted under 35 U.S.C. 154(b) by 719 days.

(21) Appl. No.: 10/406,921

(22) Filed: Apr. 4, 2003

(65) Prior Publication Data

US 2004/0197021 A1    Oct. 7, 2004

(51) Int. Cl.
*G06K 9/00* (2006.01)
*G06K 9/68* (2006.01)

(52) U.S. Cl. .................................................... 382/163
(58) Field of Classification Search ........ 382/162–165, 382/167–168, 172, 218, 272; 345/600–604, 345/619; 358/515, 518, 523, 530; 348/584
See application file for complete search history.

(56) References Cited

U.S. PATENT DOCUMENTS

| | | | | |
|---|---|---|---|---|
| 5,940,139 A | * | 8/1999 | Smoot | 348/584 |
| 6,035,058 A | * | 3/2000 | Savakis et al. | 382/163 |
| 6,288,703 B1 | * | 9/2001 | Berman et al. | 345/600 |
| 6,301,382 B1 | * | 10/2001 | Smith et al. | 382/162 |
| 6,480,623 B1 | * | 11/2002 | Yagishita et al. | 382/163 |
| 6,757,426 B1 | * | 6/2004 | Link et al. | 382/163 |
| 6,791,573 B1 | * | 9/2004 | Hamburg | 345/619 |
| 7,020,328 B1 | * | 3/2006 | Barton | 382/163 |

* cited by examiner

*Primary Examiner*—Amir Alavi
(74) *Attorney, Agent, or Firm*—Charles C. H. Wu; Wu & Cheung, LLP

(57) ABSTRACT

A method and apparatus for processing an input image to remove background color from the input image is described. The method includes the step of creating a histogram to calculate a dominant color of the input image. Next, the method determines if a threshold luminance is less than a luminance of the dominant color. If so, the method sets the output space values for RGB entries in a CMS table that match the dominant color to white. Finally, the method converts the input image to an output image by referencing the updated CMS table.

22 Claims, 3 Drawing Sheets

IMAGE BACKGROUND DETECTION AND REMOVAL

BACKGROUND OF THE INVENTION

1. Field of the Invention

The invention relates in general to image processing. More particularly, this invention relates to a method and apparatus for detecting and removing background color from an input image.

2. Description of the Related Art

In the processing of images, the removal of background colors is often desired. First, a uniform background color usually contains unimportant content. In addition, printing a background color can waste printer ink. Thus, it is often desired to detect background color in a document, and remove the background color.

In U.S. Pat. No. 2002/0159080, Feng discloses a method for background adjustment. A background lightness level in an original image is estimated using lead-edge data. Pixels are then converted to a luminance-chrominance color space. Pixels having lightness levels equal to the background lightness level are mapped to a value corresponding to white as background pixels. Chroma values for the background pixels are compared to a threshold and adjusted as needed, either by adjusting the lightness value or by removing the chrominance values. The luminance-chrominance data is then converted to output space. In summary, the method for background adjustment of Feng estimates a background color using lead-edge data and uses that color throughout its routines. The present invention, on the other hand, determines a dominant color by creating histograms indexed by RGB values of the input image. After determining the correct background color, the present invention removes portions of the image corresponding to that color.

SUMMARY OF THE INVENTION

Accordingly, one object of the present invention is to provide an image processing device and method that detect the background color of an image.

A second object of the invention is to provide an image processing device and method that remove the background color of an image.

A third object of the invention is to provide an image processing device and method that reduce the background effect of an image.

A fourth object of the invention is to provide an image processing device and method that decrease printing and copying costs.

To achieve these and other advantages and in accordance with the purpose of the invention, as embodied and broadly described herein, the invention provides a method and apparatus for processing an input image to remove background color from the input image. The method includes the step of creating a histogram to calculate a dominant color of the input image. Next, the method determines if a threshold luminance is less than a luminance of the dominant color. If so, the method sets the output space values for RGB entries in a CMS table that match the dominant color to white. Finally, the method converts the input image to an output image by referencing the updated CMS table.

Both the foregoing general description and the following detailed description are exemplary and explanatory only and are not restrictive of the invention, as claimed.

DESCRIPTION OF THE PREFERRED EMBODIMENTS

Before proceeding with a description of the method and apparatus of the present invention, a summary of the RGB color space, which may be helpful in understanding the disclosed embodiment, is provided.

RGB color is composed of specified values of red, green, and blue components. A combination of these three colors create all of the other colors in a digital representation of an image.

In a 24-bit color system, the red, green, and blue components are each allotted 8 bits. This may be referred to as an "RGB color triplet." Each color component within the RGB color triplet has a value in the range of 0 to 255. (R,G,B)=(0,0,0) represents black, an absence of color. (R,G,B)=(255,255,255), on the other hand, represents white.

In the method of the present invention, removal of background color is accomplished by modifying the Color Matching System (CMS) table, which converts input in RGB color space into a proper output color space. An often-used output space is Cyan-Magenta-Yellow (CMY) or Cyan-Magenta-Yellow-Black (CMYK) space, which is the common format for color printing.

CMYK color is specified by the cyan, magenta, yellow and black components in a color. Cyan is equivalent to "not red" or 255 red-intensity. Magenta may be thought of as "not green" or 255 green-intensity. Yellow is "not blue" or 255 blue-intensity.

This patent uses CMYK as an example, but other color spaces may also be used.

Figure 1:
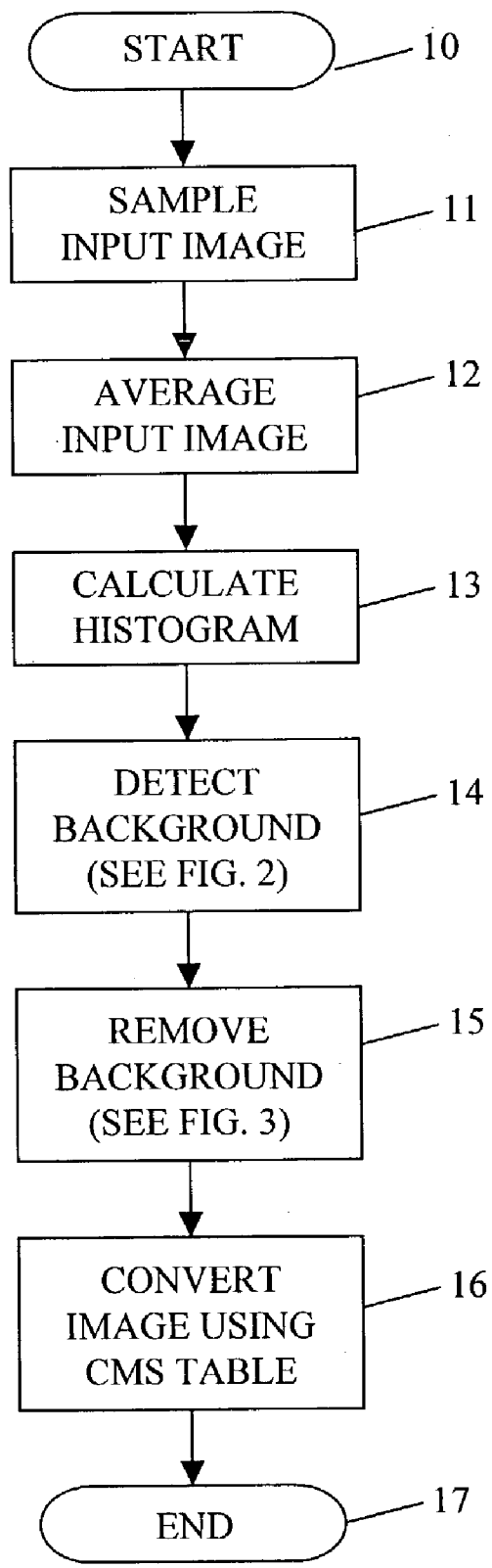
FIG. 1 is an overall block diagram illustrating the process of the present invention.

Referring now to FIG. 1, a block diagram of the overall process of the present invention is shown. The process begins with start bubble 10 followed by a process step (block 11) of sampling the input image. The input image is sampled across the image by a sampler. As an alternative, all pixels in the image may be used. At each sampling location, the RGB values of the sampled pixel and its neighboring pixels are obtained and averaged (block 12). The averaging operation removes possible color deviation in the image acquisition process. For example, if the image is obtained through color scanning or captured by a digital camera, color fringing may occur along object boundaries.

With reference to FIG. 1, the process continues with a process step (block 13) of calculating a histogram from the sampled data. The histogram is indexed by the RGB values of the samples. Nearby RGB values may be merged to form broader histogram bins. For example, if the samples are 8-bit in each of the R, G, and B channels, we may use 16 consecutive R, G, or B values to form a histogram bin. The resulting histogram will have [R=0~15, G=0~15, B=0~15] in one bin, and [R=16~32, G=128~144, B=224~240] in another. The histogram counts the number of samples whose RGB values fall into such an RGB range. Next, process step 14 detects the background color. Background color detection is further described in FIG. 2. After detecting the background color, the process continues with a process step (block 15) of removing the background color from the image. Background color removal occurs by updating entries in the CMS table that match the dominant color, or largest histogram bin. Removing the background color is further described in FIG. 3. After removing the background color, process step 16 converts the input in RGB color space into a proper output color space. In this example, the output space used is the CMYK space. However, other output spaces may be used. The process then exits (end bubble 17).

Figure 2:
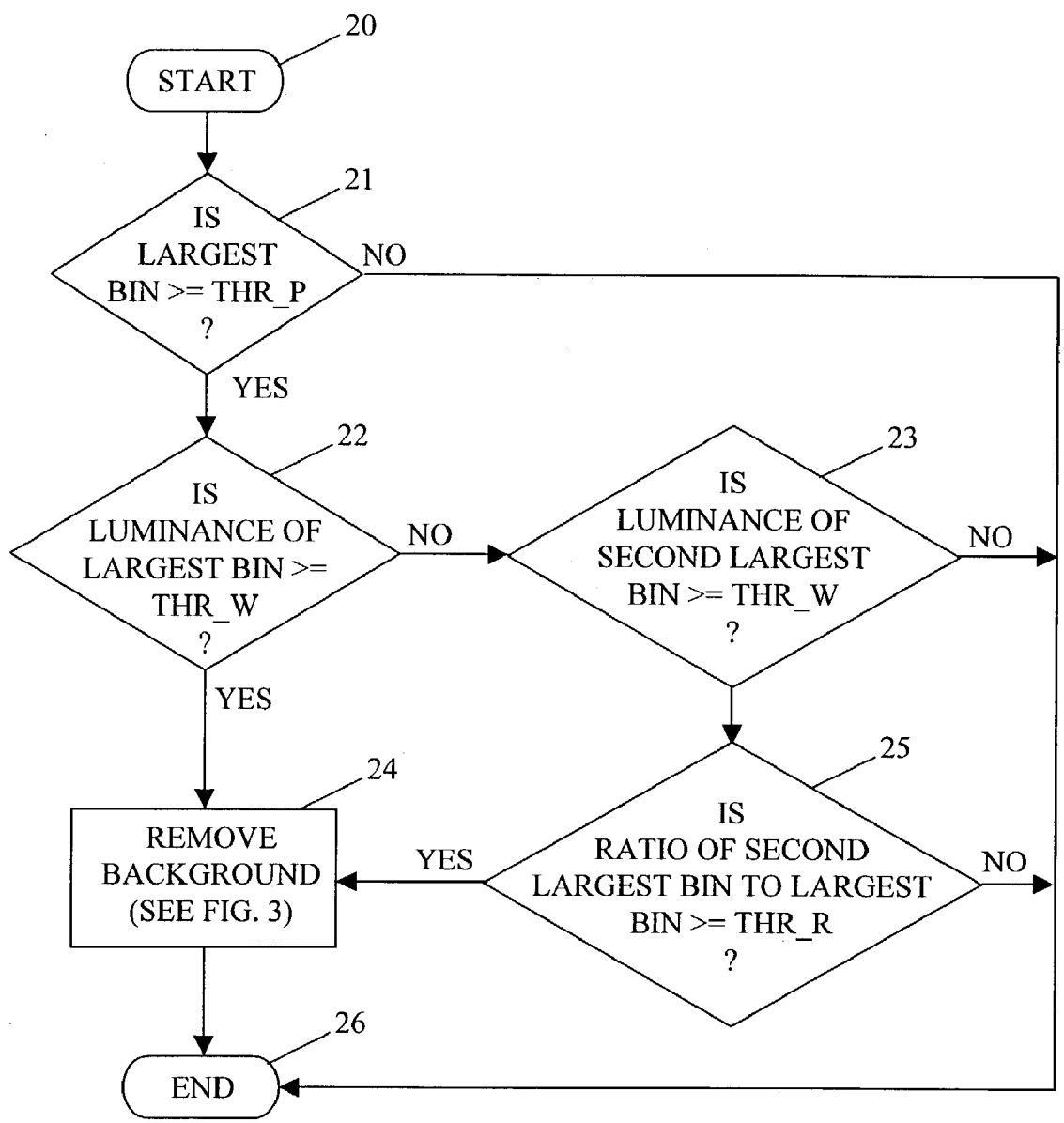
FIG. 2 is a block diagram that illustrates the process of detecting the background color.

With reference to FIG. 2, a block diagram illustrates the process of detecting the background color. Under the assumption that the background color usually occupies a large area of the image, the best candidate for the background color is the histogram bin containing the largest number of samples. However, in many situations this is not the case. Therefore, a series of tests are performed on the histogram to determine the best candidate for the background color.

Referring to FIG. 2, the process starts with start bubble 20 followed by an inquiry as to whether the ratio of the number of samples in the largest bin to the total number of samples exceeds parameter thr_P (decision diamond 21). Parameter thr_P represents the threshold percentage for a background color. If the answer posed by this inquiry is no, the process exits without removing background color (end bubble 26). Otherwise, the process continues with an inquiry as to whether the luminance of the largest bin is greater than or equal to parameter thr_W (decision diamond 22).

Parameter thr_W represents the threshold luminance value for a background color. The luminance of an RGB color can be determined by transforming the RGB color into a luminance-chromaticity-based space such the YUV space. Alternatively, some other measure to represent the brightness of the color may be used. By comparing the luminance value of the the largest bin to thr_W, the process ensures the dominant color is a light color. Though it is possible to remove dark background color using this algorithm, it is usually undesired and very rare in the industry. Shall such need arise, the process can lower the value of parameter thr_W. In extreme cases, the process can totally disable this decision block by setting $thr\_W=0$.

If the answer posed by the inquiry of decision diamond 22 is yes, the process removes the background color (block 24) and exits (end bubble 26). Background removal is further described in FIG. 3. If the answer to decision diamond 22 is no, the process explores the possibility that a light dominant color is in the second largest bin, which is not uncommon in practical situations.

The process poses an inquiry as to whether the luminance of the bin with the second largest number of samples is greater than or equal to thr_W (decision diamond 23). As described earlier, this comparison ensures the background color is a light color.

If the answer to decision diamond 23 is no, the process exits without removing the background color (end bubble 26). Otherwise, the process continues with an inquiry as to whether the ratio of the number of samples in the second largest bin to the number of samples in the largest bin is greater than or equal to parameter thr_R (decision diamond 25). Parameter thr_R represents a quantity dominant enough to be a valid background color. If the answer to this inquiry is yes, the process performs background removal (block 24) and exits (end bubble 26). If the answer to this inquiry is no, the process exits without removing the background color (end bubble 26).

Figure 3A:
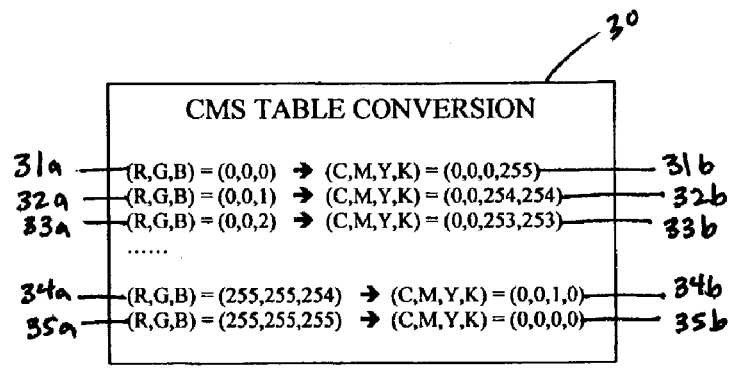
FIGS. 3A and 3B illustrate an example of background color removal.
Figure 3B:
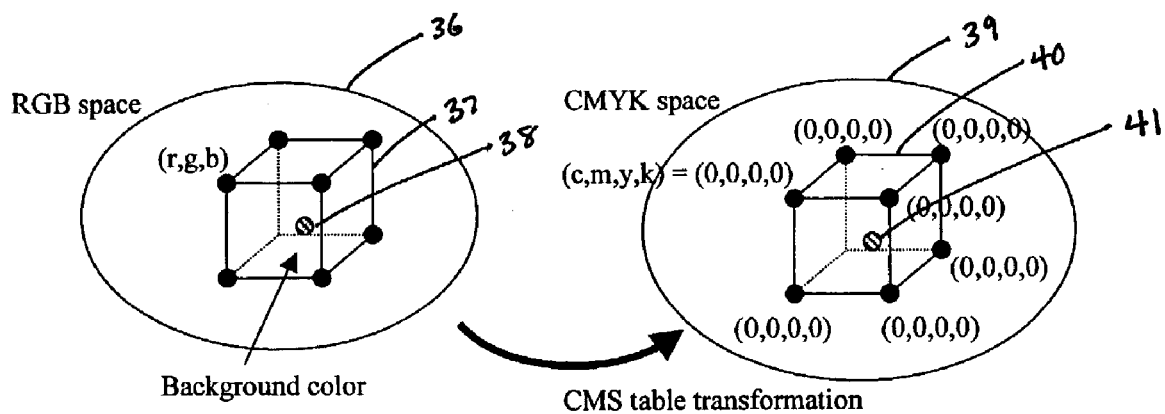

FIGS. 3A and 3B combine to form an example of background color removal. FIG. 3A illustrates a CMS table with RGB input and corresponding CMYK output. FIG. 3B is a pictorial representation illustrating background color removal in the CMYK output space.

Referring now to FIG. 3A, a CMS table with RGB input and corresponding CMYK output is shown. CMS table 30 contains RGB values like 31a, 32a, 33a, 34a and 35a. For each RGB value, CMS table 30 contains a corresponding CMYK value such as 31b, 32b, 33b, 34b and 35b. An ideal CMS table should have the mapping from all possible RGB values to their corresponding CMYK values. In practice, however, CMS table 30 may not provide entries for all possible input RGB values because the resulting table would be too large. Some uniformly or non-uniformly spaced RGB lattice values and their transformation to CMYK space is provided, while other in-between RGB-to-CMYK transformations are obtained by interpolating from neighboring RGB-to-CMYK table entries. In one embodiment of the invention, the RGB lattice spacing is set to be identical to the histogram bin spacing because it is the most straightforward and convenient way to integrate the background detection and removal stages. In an alternative embodiment, further interpolation may be required.

Referring now to FIG. 3B, a pictorial representation illustrating background color removal in the CMYK output space is shown. A background pixel 38 is confined within an RGB cell 37, and the RGB cell 37 is within RGB space 36. In removing the background color, the process of the present invention changes the corresponding CMYK cell 40 in CMYK output space 39 to the color white. This is done by setting (C,M,Y,K)=(0,0,0,0) for all vertices in cell 40. By changing the CMYK output value, background color 41 is removed.

In the ideal case of FIG. 3B, all the background pixels have their RGB colors confined in to RGB cell. In real cases, however, the background colors are usually diverse enough to span over a range of cells. An upper threshold thrU and a lower threshold thrL are therefore needed to give the necessary tolerance to the background removal stage.

In the background detection stage, a histogram bin is determined to contain background color. Assuming the histogram bin is bound by RGB values [Ri,Ri+kr], [Gi,Gi+kg], and [Bi,Bi+kb], the spacing would be kr, kg, and kb, respectively. If the CMS table has the same spacing as the histogram, the eight vertices of the RGB cube are:

(Ri,Gi,Bi), (Ri,Gi,Bi+kb), (Ri,Gi+kg,Bi), (Ri,Gi+kg,Bi+kb), (Ri+kr,Gi,Bi), (Ri+kr,Gi,Bi+kb), (Ri+kr,Gi+kg,Bi), (Ri+kr,Gi+kg,Bi+kb)

The corresponding CMYK entries in the CMS table should be set to zero. In other words, the process of the present invention sets the CMYK entries in the CMS table to zero if the (R,G,B) value in the table satisfies:

$Ri<=R<=Ri+kr$ $Gi<=G<=Gi+kg$ $Bi<=B<=Bi+kb$

With the addition of the tolerance parameters thrU and thrL, the CMYK entries are set to zero if the (R,G,B) value in the table satisfies:

$Ri-thrL<=R<=Ri+kr+thrU$ $Gi-thrL<=G<=Gi+kg+thrU$ $Bi-thrL<=B<=Bi+kb+thrU$

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for processing an input image to remove background color from the input image, the method comprising the steps of:
   creating a histogram to calculate a dominant color of the input image;
   determining if a threshold luminance is less than a luminance of the dominant color, and if so, setting output space values for RGB entries in a CMS table that match the dominant color to white; and
   converting the input image to an output image by referencing the CMS table.

2. The method according to claim 1 wherein the input image is in RGB format.

3. The method according to claim 1 wherein the output space is a CMYK output space.

4. The method according to claim 1 wherein the output space is a CMY output space.

5. The method according to claim 1 wherein the input image is sampled.

6. The method according to claim 5 wherein the input image is averaged to remove color deviation.

7. The method according to claim 6 wherein the histogram is arranged as bins indexed by RGB values of the input image, the dominant color forming a largest bin.

8. The method according to claim 5 wherein the luminance of the dominant color is determined by transforming the dominant color into a luminance-chromacity-based space.

9. The method according to claim 1 wherein it is determined the threshold luminance is not less than the luminance of the dominant color, further comprising:
   determining a next luminance of a next dominant color greater than or equal to the threshold luminance; and
   changing output space values for RGB entries in the CMS table that match the next dominant color to white.

10. The method according to claim 1 wherein the step of converting the input image includes matching an RGB entry in the CMS table with the dominant color.

11. The method according to claim 1 wherein the step of converting the input image includes interpolating adjacent RGB entries in the CMS table to match the dominant color.

12. A method for processing an input image to remove background color from the input image, the method comprising the steps of:
   creating a histogram to calculate a first dominant color and a second dominant color of the input image;
   determining if a threshold luminance is less than a luminance of the first dominant color, and if so, changing output space values for RGB entries in a CMS table that match the first dominant color to white, otherwise;
   determining if the threshold luminance is less than a luminance of the second dominant color, and if so, changing output space values for RGB entries in the CMS table that match the second dominant color to white; and
   converting the input image to an output image by referencing the CMS table.

13. An image processing device forming a reproduced image without background color, the image processing device comprising:
   an input unit capable of receiving an RGB input image; and
   a CMS table coupled to the input unit, the CMS table referencing output space values for the RGB input image, the CMS table setting output space values for a dominant color of the RGB input image to white if a threshold luminance is less than a luminance of the dominant color, the dominant color being calculated by a histogram.

14. The image processing device according to claim 13 wherein the output space is a CMYK output space.

15. The image processing device according to claim 13 wherein the output space is a CMY output space.

16. The method according to claim 15 wherein the RGB input image is sampled.

17. The method according to claim 16 wherein the RGB input image is averaged to remove color deviation.

18. The image processing device according to claim 13 wherein the histogram is arranged as bins indexed by RGB values of the RGB input image, the dominant color forming a largest bin.

19. The image processing device according to claim 13 wherein the luminance of the dominant color is determined by transforming the dominant color into a luminance-chromacity-based space.

20. The image processing device according to claim 13 wherein it is determined the threshold luminance is not less than the luminance of the dominant color, the CMS table setting output space values to white for a next dominant color having a next luminance greater than or equal to the threshold luminance, the next dominant color being calculated by the histogram.

21. The image processing device according to claim 13 wherein the CMS table references output space values by matching an RGB entry in the CMS table with the dominant color.

22. The image processing device according to claim 13 wherein the CMS table references output space values by interpolating adjacent RGB entries in the CMS table to match the dominant color.

* * * * *